Z. LITTMAN.
VALVE.
APPLICATION FILED JULY 12, 1920.
1,397,737.
Patented Nov. 22, 1921.
2 SHEETS—SHEET 1.
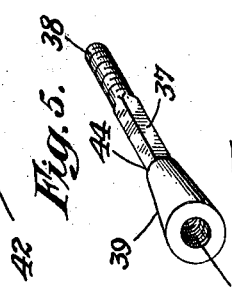
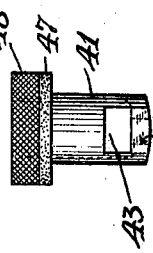
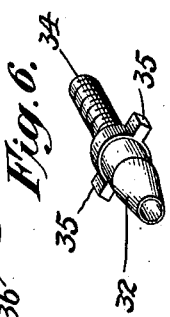
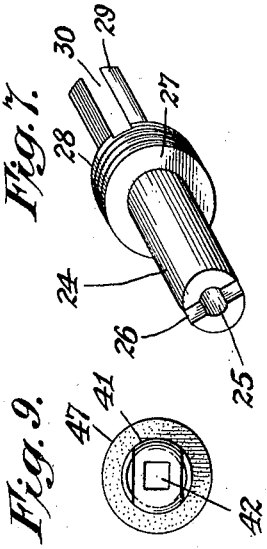
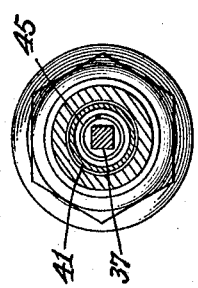
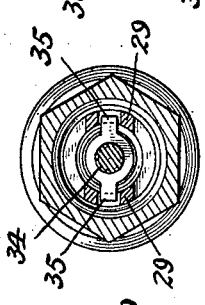
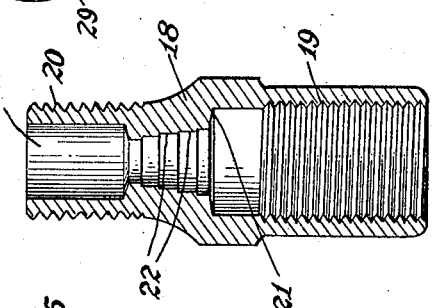
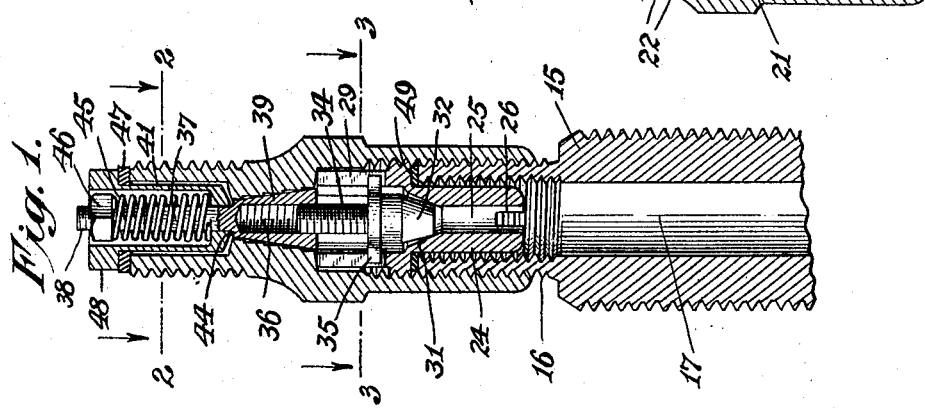

Z. LITTMAN.
VALVE.
APPLICATION FILED JULY 12, 1920.
1,397,737.
Patented Nov. 22, 1921.
2 SHEETS—SHEET 2.
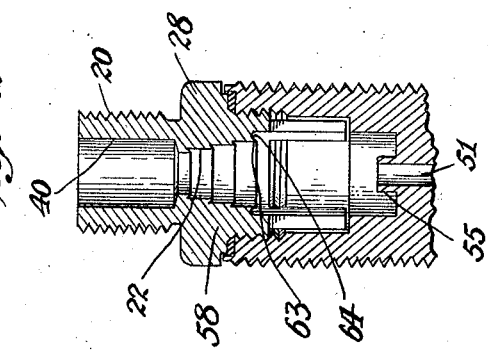
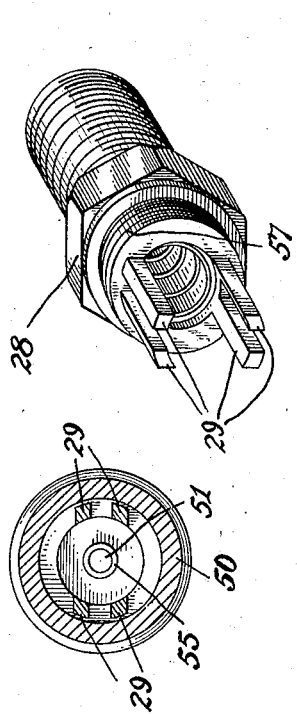
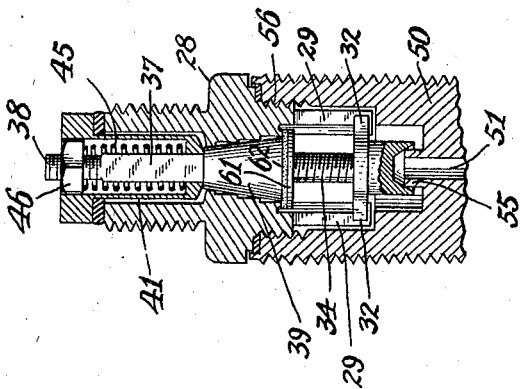
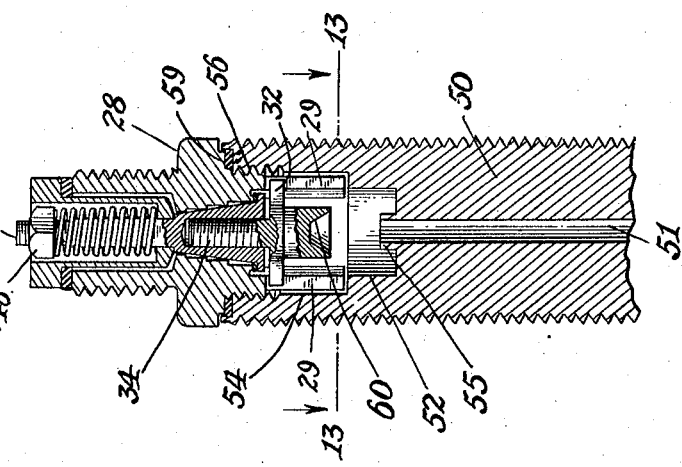

UNITED STATES PATENT OFFICE.

ZENO LITTMAN, OF NEW YORK, N. Y., ASSIGNOR TO LITTMAN LOXAIR VALVE CORPORATION, A CORPORATION OF DELAWARE.

VALVE.

1,397,737.  Specification of Letters Patent.  Patented Nov. 22, 1921.

Application filed July 12, 1920. Serial No. 395,725.

*To all whom it may concern:*

Be it known that I, ZENO LITTMAN, a citizen of the United States, residing at New York, in the county of New York and State of New York, have invented certain new and useful Improvements in Valves, of which the following is a specification.

This invention relates generally to valves and particularly to valve structures, such as are used in connection with pneumatic vehicle tires or the like.

One of the objects of the invention is to provide in a valve structure of this type two distinct spaced valve seats, with a 2-part valve proper bodily movable as a whole between the two valve seats, the two parts of the valve proper being relatively movable, with means for accomplishing such relative movement of the valve parts to move them respectively into or out of engagement with the two valve seats.

A further object of the invention is to provide for the accomplishment of the object just stated by an arrangement of the parts wherein one of the valve parts is rotatable and is non-positively normally biased toward closing relation with its corresponding valve seat, but movable against its bias toward open relation, and wherein upon rotation of the biased valve member without movement of travel thereof, the other valve member is positively moved to closing or opening relation with respect to its valve seat.

Still another object of the invention is to provide a valve and valve seat of such conformation that when the valve is in sealing relation to its seat a substantially hermetic seal or closure will result and without the use of compressible packings or gaskets, so that I may obtain a seal by contact of metal with metal.

Other objects of the invention more or less broad than those stated above, will be in part obvious and in part specifically referred to in the course of the following description of the arrangements, combinations of parts, and applications of principles constituting the invention; and the scope of protection contemplated will appear from the claims.

In the accompanying drawings, in which I have illustrated a merely preferred form of embodiment of the invention as applied, for example, to a tire valve, Figure 1 is a central vertical sectional view with parts in elevation, disclosing how my invention may be applied to the well known Schrader type of tire valve shell; Fig. 2 is a horizontal sectional view taken on the line 2—2 of Fig. 1, looking in the direction of the arrows; Fig. 3 is a horizontal sectional view taken on the line 3—3 of Fig. 1, looking in the direction of the arrows; Fig. 4 is an elevation of the controller; Figs. 5 and 6 are perspective views of the two valve members proper; Fig. 7 is a perspective view of the lower or inner valve seat member; Fig. 8 is a sectional view of the upper or outer valve seat member, detached; Fig. 9 is an end view of the controller shown in Fig. 4; Fig. 10 is a view similar to Fig. 1 with parts in elevation and parts broken away, illustrating another embodiment of the invention and with the valve parts in position ready for inflation of the tire, to which the valve and structure is assumed to be applied; Fig. 11 is a view similar to Fig. 10, but showing the valve parts in positively sealed relation; Fig. 12 is a view similar to Fig. 11, but with the valve parts proper removed and illustrating only the valve seat members; Fig. 13 is a sectional view taken on the line 13—13 of Fig. 10, looking in the direction of the arrows, and Fig. 14 is a perspective view of the upper or outer valve seat member detached.

Referring to the numerals on the drawing, and first to Figs. 1 to 9 inclusive, there is shown at 15 an ordinary tube or shell of the Schrader type, externally threaded at 16, and having a bore 17 for the passage of air, as usual. 18 indicates an upper or outer valve seat member, having the general form of a tube, internally threaded at its lower end, as indicated at 19, for engagement with the external threads 16 of the shell 15, and externally threaded at its outer end, as indicated at 20, for engagement with the pump connection, not shown. Intermediate the two ends of this tube 18 there is an internal shoulder 21, and between this shoulder 21 and the outer end of the tube there is formed in the bore of the tube a valve seat comprising a series of steps 22 of diameter progressively smaller toward the outer or upper end of the tube (Fig. 8). It will be understood that when the valve seat member 18 is in the Fig. 1 position the valve seat made up of the steps 22 is stationary.

The second or lower valve seat member is best illustrated at Figs. 1 and 7, and comprises a tubular part 24 having a bore 25, with a kerf 26 across its lower or inner end whereby it may be turned as hereinafter described; an enlarged collar 27, externally threaded as indicated at 28, and outwardly beyond this collar 27, four up-standing projections 29, defined by slits 30. Internally the bore of this valve seat member 24 may be provided with a conical valve seat 31, tapering downwardly in Fig. 1, and this valve seat member 24 is screwed into the internally threaded lower end 19 of the tube 18, as shown in Fig. 1.

The valve proper consists of two parts which are shown in assembled relation in Fig. 1 and shown separately in Figs. 5 and 6. The valve part shown in Fig. 6 is intended to coöperate with the valve seat 31 of the tube 24, and therefore includes a conical valve part proper 32 shaped to correspond with the valve seat 31, a threaded stem 34, and two laterally extending wings 35. These wings 35 are accommodated in opposite slits 30 at the upper end of the tube 24, whereby rotation of the conical valve part 32 relatively to its valve seat 31 is prevented, while motion of the valve part 32 toward and away from the valve seat 31, may be permitted. The threaded stem 34 engages in the internally threaded part 36 of the other or upper valve part, this upper valve part (shown in Fig. 5) having a stem which at its inner end is squared or non-circular, as indicated at 37, and at its outer end is threaded, as indicated at 38. The second valve part proper, which is indicated by the reference character 39, is tapered or conical to correspond with the conical stepped valve seat in the outer end of the tube 18, the valve part 39 thus coöperating with the valve seat 22 and making sealing contact with the edge of each shoulder of the stepped valve seat 22, as clearly shown in Fig. 1. The stem portions 37 and 38 of the valve part 39 extend outwardly through the bore of the tube 18 and into an enlarged bore 40 which is inclosed by the outer externally threaded end 20 of the tube 18. 41 indicates a controller thimble which has a constricted opening indicated in dotted lines in Fig. 4 by the reference character 42, and through this squared opening 42 passes a squared portion 37 of the stem that extends outwardly from the valve part 39. The flanged end of the thimble 41 rests against the outer end of tube 18, and the thimble is of a size to be accommodated within the enlarged bore 40, as is clear from Fig. 1. Surrounding the stem portions 37 and 38 is a coiled expansion spring 45, whose lower end rests against the bottom of the thimble adjacent the squared opening 42, and whose upper end bears against a nut 46 which is threaded on to the outer threaded end of the stem portion 38. If desired I may provide a packing 47 between the outer end of the tube 18 and the overhanging flange 48 of the thimble, this flange 48 being perferably knurled so that it may be readily manipulated in the operation of the device. In assembling, the valve part shown in Fig. 6 is connected to the valve part shown in Fig. 5, by threading the stem part 34 into the internally threaded socket 36. The assembled valve parts are then inserted into the lower end of the tube 18, the stem parts 37 and 38 extending through the valve seat 22 and into the enlarged bore 40. Then the thimble 41 is placed in the bore 40, around stem parts 37 and 38, spring 45 is put in position around the stem parts 37 and 38 and the nut 46 turned down on to the stem part 38, placing the spring 45 under compression. Inasmuch as outward movement of the assembled valve parts is limited by the contact of the valve part 39 with its seat 22, the effect of the spring will be to hold the valve part 39 against its seat 22 and to hold the thimble 41 always in its Fig. 1 position. The valve seat member or tube 24 is now screwed up into the threaded end 19 of the tube 18 until it reaches the inner end of the thread 19, after which the thimble 41, coiled spring 45 and nut 46 are put in place as shown in Fig. 1, the wings 35 passing between opposite slits 30 at the outer end of valve seat member 24. If desired a gasket 49 may be placed over the lower or inner face of the collar 27, so that when the threaded end 19 of the tube 18 is screwed down into position over the end of the shell 15, as shown in Fig. 1, the joint between the shell 15 and tube 18 will be sealed.

It will be evident from the construction described that the valve comprises two relatively movable parts, 32 and 39, the valve part 32 coöperating with the valve seat 31, and the valve part 39 coöperating with the valve seat 22. It will also be evident that regardless of whether the valve member 32 extends more or less away from the valve member 39, the valve member 39 will be biased toward closing position with relation to its seat 22 by reason of spring 45, and the back-pressure from the tire. It will also be evident that since the valve member is held in seating position, if the controller thimble 41 be turned in one direction or the other, the result will be to draw the stem part 34 up into the socket 36, or cause it to travel spirally out of the socket, according to the direction of rotation of the thimble. The parts are shown in Fig. 1 in that position in which the thimble 41 has been turned as far as possible in one direction to drive the valve member 32 downwardly away from the valve member 39, thus positively closing the valve seat 31, and the reaction forces the valve member 39 into positive locking engagement with its valve seat 22, so that air can neither enter nor escape from the shell 15, and the connected valve-parts cannot be moved between the valve-seats. When it is desired to deflate a tire to which this valve is applied, or to introduce air into the tire the controller thimble 41 is rotated in the opposite direction, which results in drawing the stem 34 spirally into the socket 36, so that the valve part 32 retreats from its seat 31, the valve 39 all the while remaining closed against its seat 22, because of the action of the spring 45, and the back-pressure from the tire. When the valve seat 31 has been sufficiently uncovered, deflation of the tire may be accomplished by pushing down on the end of the stem 38, this resulting in moving the valve part 39 away from its seat 22; or if air under sufficient pressure is introduced through the outer end of the tube 18, this pressure will force the valve 39 downwardly against the force of the spring 45 and of the back-pressure from the tire. But as soon as the pressure from outside the tube becomes less than that inside the tube, or as soon as the spring 45 is permitted to function, the valve part 39 will close its seat 22. The passage of air in an outward direction is now substantially prevented, but not positively, and in order to insure the seal the controller 41 will be turned as heretofore described, to cause the valve part 32 to travel downwardly into locking engagement with the seat 31, this resulting incidentally in driving the valve part 39 into positive locking engagement with its seat 22. The function of the wings 35 is of course to prevent rotation of the valve part 32 upon operation of controller 41, while permitting bodily travel of the valve part 32.

It will be obvious that the spring 45 might be dispensed with, although I like to use it because it insures a better maintenance of the relations of the parts. If no spring were employed I would have to depend on the back pressure of the tire to keep the valve part 39 in seating position, and in cases where there would be no back pressure initially, I would have to provide for limiting the downward movement of the valve part 39 away from its seat in order that when air was introduced into the outer end of the tube 18 the pressure thereof should not drive the connected valve parts so far downwardly that the valve member 32 would seal off the valve seat 31 and thereby prevent inflation entirely. This limitation is readily accomplished by threading the nut 46 far enough down on the stem of the upper valve part so that its contact with the bottom of the thimble will occur prior to the time when the valve part 32 comes in contact with its seat 31, assuming of course, that the stem 34 is fully screwed up into socket 36. The same sort of precaution must be taken even when the spring is employed.

In Figs. 10 to 14 inclusive, I have shown another form of embodiment of the device in which instead of adapting my invention as an assembled unit applicable to a valve shell in general use, I provide a new form of valve shell, specially designed. In those figures the numeral 50 indicates a shell, provided with a bore 51 with an enlargement 52 in the bore at the outer end thereof, and a further enlargement 54 outwardly beyond the enlargement 52. 55 indicates a ring or curb immediately surrounding the main bore 51 and spaced away from the wall of the enlarged bore 52, this ring or curb 55 constituting a valve seat, as will hereinafter appear. The shell 50 is internally threaded as indicated at 56 to receive the external threads 57 of an upper valve seat member 28', shown in perspective in Fig. 14. This valve seat member 28' has a bore through it, the inner end of this bore being made up of a series of shoulders of gradually decreasing diameter from the inner end to the outer end, thus providing a stepped valve seat similar to the valve seat 22 already described. Outwardly beyond the stepped valve seat 22' the bore of the valve seat member 28' is again enlarged, as indicated at 40, and it is externally threaded, as indicated at 20, around this enlarged bore 40. Inwardly of its threaded portion 57 the valve seat member 28' carries downwardly projecting spaced extensions 29', and there is a flange 58 which overhangs the outer end of the shell 50 when the valve seat member 28 is screwed down into position within the shell 50, as shown in Fig. 10. If desired a packing 59 may be introduced between this flange and the end of the shell 50. Thus I provide an upper valve seat 22' corresponding to the valve seat 22 in the embodiment previously described, and a lower valve seat 55 corresponding to the valve seat 31 of the other embodiment. The valve parts proper are in the main substantially as shown in previous figures. There is an upper valve member 39' coöperating with the stepped seat 22', and this valve member 39' has stem portions 37 and 38, and there is a spring 45, nut 46, and controller thimble 41. If desired the conical valve part may be shouldered at its inner end to provide a flange 61 on which may be seated a packing 62 for coöperation with the edge 63 at the large end of the valve seat, this edge being defined by the under-cut 64 (Fig. 12). The second valve seat part comprises a dished end 60 which engages over the ring or curb valve seat 55 when in sealing positions; wings 32, and a threaded stem 34 which engages in a correspondingly threaded socket in the valve part 39'. The action of this form of embodiment of the valve, so far as the movements of the valve part are concerned, is substantially the same as with respect to the other embodiment. I conceive it to be of importance. however, that the contact between the valve 60 and the valve seat 55 is substantially a knife edge contact, which enables me to secure a hermetic seal without the use of compressible packing. Furthermore, particularly in case no spring 45 is used in this embodiment, and back-pressure has to be relied on to keep the valve member 39' non-positively seated, the dished form of valve member 60 facilitates the closing operation, because the air coming out of constricted opening 55 concentrates all its force against the interior of the cup 60. The seal between the valve member 39' and the stepped valve seat 22' is also made by a series of knife edge contacts, and because of the step arrangement I believe that there is some spring action, that is to say that the edges of the valve seat member yield slightly, the better to accommodate themselves to the opposing valve member. Furthermore if any dust or dirt should get into the valve, its presence in a construction of this sort where there are only knife edge contacts can do no harm and may in fact improve the seal. And all of the knife-edge seals illustrated lend themselves very well to an all-metal valve construction.

The valve may be provided with the usual dust cap engaging over the controller 41 and threaded on to the threads 20, but such a cap is not absolutely necessary and the device presents a finished appearance without it. Air passes from the interior of the thimble 41 to the bore 40 and thence to the interior of the valve structure by way of one or more cut-outs 43 in the side wall of the thimble.

I claim:

1. A valve structure having two spaced valve-seats, constituting the ends of a valve chamber between them, and two valve members for the respective seats connected together for bodily movement as one within the valve chamber and between the valve-seats, and for movement of separation or approach relatively to each other.

2. A valve structure having two spaced valve-seats constituting the ends of a valve chamber between them, and two valve members for the respective seats connected together for bodily movement as one within the valve chamber and between the valve-seats, and for movement of separation or approach relatively to each other, and spring means urging the connected valve-members as a unit toward one of the valve-seats, whereby the valve-member appropriated to the last-named valve-seat tends to close it.

3. A valve structure having two spaced valve-seats constituting the ends of a valve chamber between them, and two valve members for the respective seats connected together for bodily movement as one within the valve chamber and between the valve-seats, and for movement of separation or approach relatively to each other, one of the valve-members having a part accessible from the outside of the structure, for accomplishing such movements of approach or separation.

4. A valve structure having two spaced valve-seats constituting the ends of a valve chamber between them, with two valve-members for the respective seats connected together for bodily movement as one within the valve chamber and between the valve-seats, and for movement of separation or approach relatively to each other, the contact of one of the valve-members with its seat limiting in one direction the movement of the connected valve-members as a unit, and means for limiting such movement in the opposite direction toward the other valve-seat.

5. A valve structure having two spaced valve-seats constituting the ends of a valve chamber between them, and two valve-members for the respective seats connected together for bodily movement as one within the valve chamber and between the seats, and for moment of approach or separation relatively to each other, the contact of one of the valve members with its seat limiting in one direction the movement of the connected valve-members as a unit, means acting on the connected valve-members to keep the last-named valve-member on its seat, and means for limiting the bodily movement of the two valve-members toward the other seat.

6. A valve structure having two spaced valve-seats constituting the ends of a valve chamber between them, and two valve-members for the respective seats connected together for bodily movement as one within the valve chamber and between the valve-seats, and for movement of separation or approach relatively to each other, the structure having attaching portions whereby it may be connected to a tubular valve-shell.

7. A valve structure as set forth in claim 1, in which the valve-members have correspondingly threaded parts, whereby one may be advanced or retracted with relation to the other, and in which means are provided to rotate one part while holding it bodily stationary, with means for preventing rotation of the other part while permitting its bodily travel.

8. A valve structure comprising a tube formed with a valve-seat, a second tube detachably carried by the first tube and formed with a second-valve seat, a rotatable valve-member movable toward and away from the first seat, another valve-member coöperative with the second seat and having threaded connection with the first valve member, means to prevent rotation of the second-named valve-member while permitting its bodily travel, and a stem extending from the first-named valve-member through the first-named valve-seat and to the outside of the tube in which the first-named valve-seat is formed whereby the first-named valve-member may be rotated.

9. A valve-structure as set forth in claim 8, in which means are provided to limit movement of the rotatable valve-member away from its seat.

10. A valve structure as set forth in claim 8, in which there is provided a thimble with its body set into the outer end of the first-named tube and with a flange overhanging the outer end of the tube and with its bottom apertured and non-rotatively surrounding the stem.

11. A valve structure as set forth in claim 8, in which there is provided a thimble with its body set into the outer end of the first-named tube and with a flange overhanging the outer end of the tube and with its bottom apertured and non-rotatively surrounding the stem, and in which there is a coiled spring set into and bearing at one end against the bottom of the thimble, with a stop on the stem against which the other end of the spring bears.

12. In a device of the kind described, a valve seat member adapted to be detachably mounted on the end of a shell, a second valve seat member detachably associated with the first mentioned member, the two valve seats constituting the ends of a valve chamber between them, and two valve members for the respective seats connected together for bodily movement as one within the valve chamber between the valve seats, and for movement of separation or approach relatively to each other.

In testimony whereof I affix my signature.

ZENO LITTMAN.